(12) United States Patent
McKay

(10) Patent No.: US 11,795,042 B2
(45) Date of Patent: Oct. 24, 2023

(54) APPARATUS FOR LOADING AND STORING LARGE BALES

(71) Applicant: Penno's Machining and Manufacturing Ltd., Eden (CA)

(72) Inventor: Howard McKay, Eden (CA)

(73) Assignee: Penno's Machining and Manufacturing Ltd., Eden (CA)

( * ) Notice: Subject to any disclaimer, the term of this patent is extended or adjusted under 35 U.S.C. 154(b) by 31 days.

(21) Appl. No.: 17/674,454

(22) Filed: Feb. 17, 2022

(65) Prior Publication Data

US 2023/0054618 A1   Feb. 23, 2023

(30) Foreign Application Priority Data

Aug. 18, 2021 (CA) .................................. CA 3128575

(51) Int. Cl.
  *B66F 9/14* (2006.01)
  *B66F 9/16* (2006.01)
  *A01D 87/12* (2006.01)
  *B66F 9/20* (2006.01)

(52) U.S. Cl.
  CPC ............ *B66F 9/143* (2013.01); *A01D 87/122* (2013.01); *A01D 87/127* (2013.01); *B66F 9/16* (2013.01); *B66F 9/20* (2013.01)

(58) Field of Classification Search
  CPC .. A01D 87/122; A01D 87/126; A01D 87/127; B66F 9/143
  USPC ........................................................ 414/24.5
  See application file for complete search history.

(56) References Cited

U.S. PATENT DOCUMENTS

| | | | |
|---|---|---|---|
| 7,753,636 B2 * | 7/2010 | Hennig | A01D 87/127 414/722 |
| 8,444,362 B2 * | 5/2013 | Hennig | A01D 87/122 414/920 |
| 9,210,843 B1 * | 12/2015 | Collom | A01D 87/122 |
| 9,232,685 B2 | 1/2016 | Habert et al. | |
| 9,232,695 B1 * | 1/2016 | Hennig | A01D 87/127 |
| D786,943 S | 5/2017 | Gardner | |
| 2014/0212244 A1 | 7/2014 | Meyer | |

OTHER PUBLICATIONS

CPO; Office Action for Canadian Patent Application No. 3,128,575 dated Jan. 20, 2023, 8 pages.
"Swingspear: The Newest & Most Efficient Way to Handle Round Hay Bales", 22 pages, accessed at: https://swingspear.com/.

* cited by examiner

*Primary Examiner* — Mark C Hageman
(74) *Attorney, Agent, or Firm* — NK Patent Law

(57) ABSTRACT

A bale loading apparatus has a base frame mounted to a loader vehicle operative to move the base frame up and down. Right and left fork frames are connected to right and left portions of the base frame by corresponding right and left linkages, and right and left fork pairs extend away from the loader end of the base frame. A right actuator is operative to pivot the right fork pair with respect to the base frame upward and outward to the right of a path of the loader vehicle from a lowered right position to a raised right position, and a left actuator is operative to pivot the left fork pair with respect to the base frame upward and outward to the left of the path of the loader vehicle from a lowered left position to a raised left position.

5 Claims, 3 Drawing Sheets

APPARATUS FOR LOADING AND STORING LARGE BALES

CROSS-REFERENCE TO RELATED APPLICATION(S)

This application claims priority to Canadian Patent Application No. 3128575 filed on Aug. 18, 2021, the entire content of which is incorporated by reference herein.

FIELD OF THE INVENTION

This disclosure relates to the field of loading equipment and in particular an apparatus for loading large bales on a transport vehicle and then moving them off the transport vehicle onto the ground for storage.

BACKGROUND

In agricultural livestock operations large cylindrical bales of hay and straw are formed by a baler and wrapped with twine or net wrap and laid on the ground during baling operations. The bales are then picked up by a bale loader, typically mounted on the front or rear of an agricultural tractor commonly found on farms. A pair of forks is inserted into the side of the bale and then the bale is moved to a storage location, typically simply resting on the ground. The bales are commonly moved from the loader onto the bed of a transport vehicle such that a plurality of bales may be moved to the storage area at the same time.

To reduce time such loaders can be configured to pick up two bales at a time, and then place the two bales on the vehicle bed. Dragging one bale along the ground while loading the next bale can severely damage the twine or net wrap, and cause the bale fail. Loaders have thus been developed that lift one bale off the ground while picking the next bale up to avoid damage.

United States Published Patent Application Number 2014/0212244 of Meyer discloses for example a tilting dual bale spear that allows the operator to pick up two bales without dragging the first bale across the ground and ripping the net wrap.

U.S. Pat. No. 9,210,843 to Collum uses a boom with two fork pairs attached and a hydraulic cylinder to control the pivotal orientation of the boom about the longitudinal machine axis. An operator can selectively raise one of the two bale forks while simultaneously lowering the other of the two bale forks.

U.S. Design Pat. D786,943 to Gardner discloses a loader with two side-by-side pairs of forks that can pivot upward and downward to raise and lower each bale independently. Similarly U.S. Pat. No. 7,753,636 to Hennig has two side-by-side pairs of forks that move vertically up and down independently.

SUMMARY OF THE INVENTION

The present disclosure provides a bale loader apparatus that overcomes problems in the prior art.

When the bales are moved from the bed of the transport vehicle to the storage location on the ground the sides of the bales, where the twine or net wrap is exposed, should not touch each other or spoilage will occur over time. The present invention provides a bale loader apparatus with two sets of forks that can be moved independently laterally as well as vertically. A first bale can be raised above the ground, and the second bale is then picked from the ground and raised. The two bales then are moved above the bed of the transport vehicle and can be squeezed together to take up less room on the bed. The transport vehicle is then moved to the storage location where the side-by-side forks are inserted into the side-by-side bales, the bales are raised above the bed and maneuvered to the storage location where the bales are moved laterally and set down on the ground without touching each other.

In a first embodiment the present disclosure provides a bale loader apparatus for loading and storing large bales. The apparatus comprises a base frame adapted at a loader end for attachment to a loader vehicle operative to move the base frame up and down. Right and left fork frames are connected to right and left portions of the base frame by corresponding right and left linkages, and a right fork pair configured to be inserted into a first large bale is attached to the right fork frame and extends away from the loader end of the base frame. A left fork pair is configured to be inserted into a second large bale and is attached to the left fork frame and extends away from the loader end of the base frame. A right actuator is operative to pivot the right fork pair with respect to the base frame upward and outward to the right of a path of the loader vehicle from a lowered right position to a raised right position, and a left actuator is operative to pivot the left fork pair with respect to the base frame upward and outward to the left of the path of the loader vehicle from a lowered left position to a raised left position.

In a second embodiment the present disclosure provides method of picking large bales from the ground and transporting the large bales to a storage location. The method comprises mounting first and second fork pairs to a base frame mounted to a loader vehicle, the base frame operative to move up and down with respect to the loader vehicle; inserting the first fork pair into a first bale and moving the first fork pair upward and outward with respect to the base frame to a first side of a path of the loader vehicle; inserting the second fork pair into a second bale and moving the base frame upward; placing the first and second bales on a bed of a transport vehicle by moving the base frame downward to rest the second bale on the bed, and moving the first fork pair downward and inward such that the first and second bales are squeezed together and resting on the bed; withdrawing the first and second fork pairs from the corresponding first and second bales; moving the transport vehicle to the storage location; inserting the first and second fork pairs into the corresponding first and second bales and raising the first and second bales; moving the first and second bales to the storage location and moving the first and second fork pairs outward and upward and moving the base frame downward to rest the first and second bales on the ground such that the first bale is not in contact with the second bale; withdrawing the first and second fork pairs from the corresponding first and second bales.

The present disclosure provides an apparatus and method for loading and storing large bales the prevents damage to twine or net wrap on the bales, that reduces transport dimensions, and that further stores the bales so they are not touching each other to prevent spoilage.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
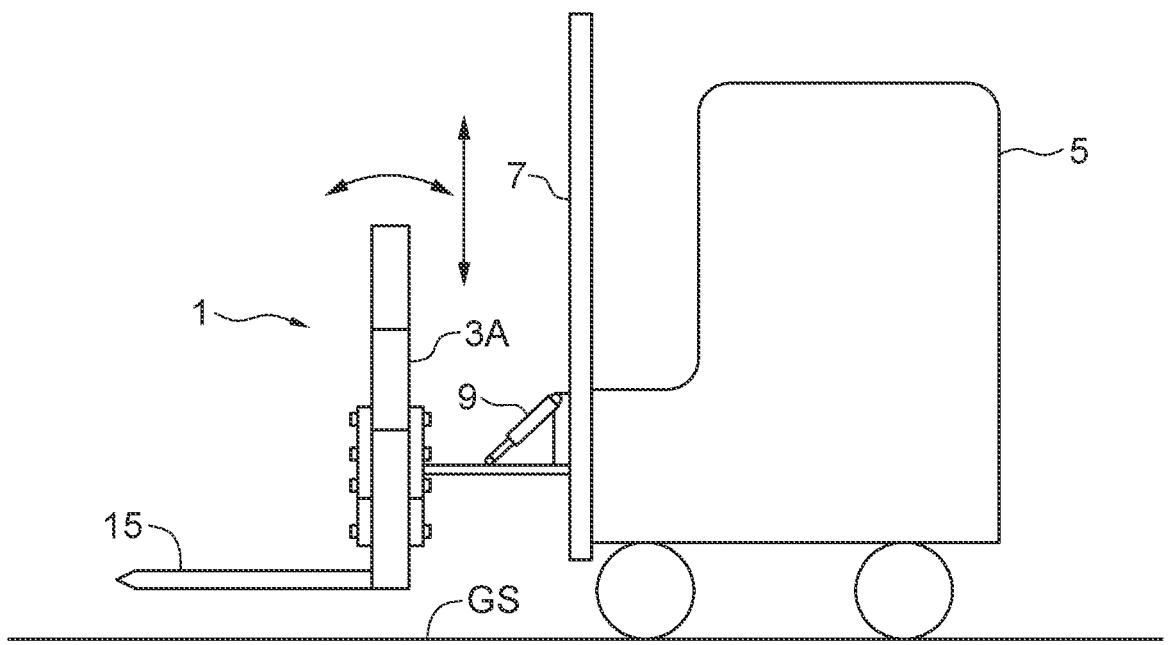
FIG. 1 is a schematic side view of an embodiment of the apparatus of the present disclosure mounted on a loader vehicle.
Figure 2:
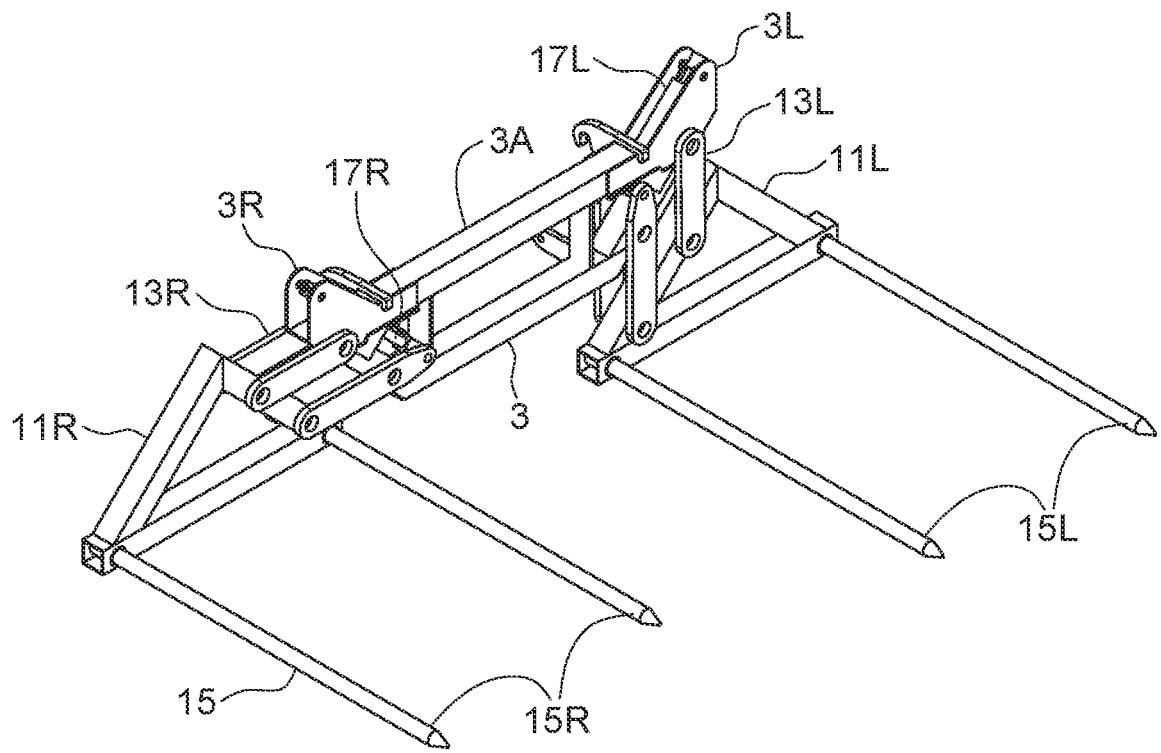
FIG. 2 is a schematic perspective view of the embodiment of FIG. 1.
Figure 3:
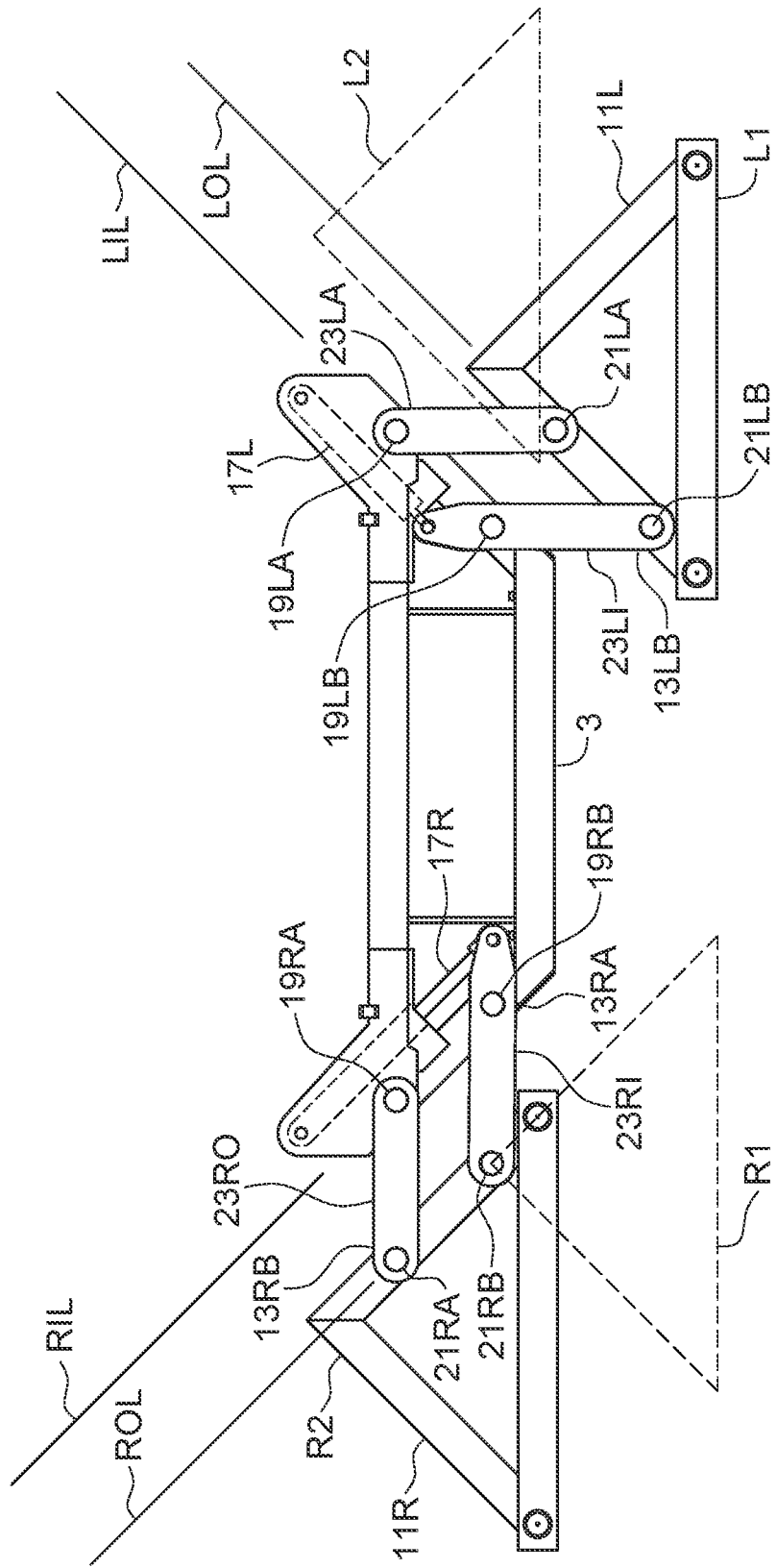
FIG. 3 is a schematic front view of the embodiment of FIG. 1.

FIGS. 1-3 schematically illustrate an embodiment of a bale loader apparatus 1 of the present disclosure for loading and storing large bales. The apparatus 1 comprises a base frame 3 adapted at a loader end 3A for attachment to a loader vehicle 5 operative to move the base frame 3 up and down on a mast 7. The loader vehicle 5 is further operative to extend and retract hydraulic cylinder 9 to tilt the base frame 3 forward and rearward. The apparatus 1 is shown mounted on a fork lift type loader vehicle 5 however could also be mounted on the front end loader of an agricultural tractor.

Right and left fork frames 11R, 11L are connected to right and left portions 3R, 3L of the base frame 3 by corresponding right and left linkages 13R, 13L. A right fork pair 15R configured to be inserted into a large bale is attached to the right fork frame 11R and extends away from the loader end 3A of the base frame 3, and a left fork pair 15L configured to be inserted into a large bale is attached to the left fork frame 11L and extends away from the loader end 3A of the base frame 3. The orientation of the right and left fork pairs 15R, 15L is shown by the forks 15 in FIG. 2 in the operating position substantially parallel to the ground surface GS.

A right actuator 17R is operative to pivot the right fork pair 15R with respect to the base frame 3 upward and outward to the right of a path of the loader vehicle from a lowered right position R1 to a raised right position R2, and similarly a left actuator 17L operative to pivot the left fork pair 15L with respect to the base frame 3 upward and outward to the left of the path of the loader vehicle from a lowered left position L1 to a raised left position L2.

The right and left linkages 13R, 13L are configured to maintain the corresponding right and left fork pairs 15R 15L substantially parallel to a ground surface when in an operating position as set by the hydraulic cylinder 9.

To maintain the proper orientation of the fork pairs 15R, 15L each of the right and left linkages 13R, 13L comprises a parallel arm linkage pivotally attached between the base frame 3 and the corresponding right and left fork frames 11R, 11L. A right parallel arm linkage 13R is pivotally connected at inner ends 13RA of the right parallel arm linkage 13R to the base frame 3 about upper and lower right base pivot axes 19RA, 19RB located on a right inner line RIL sloping upward and outward to the right with respect to the path of the loader vehicle 5, and the right parallel arm linkage 13R is pivotally connected at outer ends 13RB of the right parallel arm linkage 13R to the right fork frame 11R about upper and lower right fork pivot axes 21RA. 21RB located on a right outer line ROL sloping upward and outward to the right with respect to the path of the loader vehicle 5, and wherein the right inner line PIL and right outer line ROL are substantially parallel.

Similarly a left parallel arm linkage 13L is pivotally connected at inner ends 13LA of the left parallel arm linkage 13L to the base frame 3 about upper and lower left base pivot axes 19LA, 19LB located on a left inner line LIN sloping upward and outward to the left with respect to the path of the loader vehicle 5, and the left parallel arm linkage 13L is pivotally connected at outer ends 13LB of the left parallel arm linkage to the left fork frame 11L about upper and lower left fork pivot axes 21LA, 21LB located on a left outer line LOL sloping upward and outward to the left with respect to the path of the loader vehicle 5, and wherein the left inner line LIL and left outer line LOL are substantially parallel.

The right parallel arm linkage 13R comprises an inner right arm 23RI pivotally connected to the lower right base pivot 19RB axis and to the lower right fork pivot axis 21RB and an outer right arm 23RO pivotally connected to the upper right base pivot axis 19RA and to the upper right fork pivot axis 21RB. The left parallel arm linkage 13L comprises an inner left arm 23LI pivotally connected to the lower left base pivot axis 19LB and to the lower left fork pivot axis 21LB and an outer left arm pivotally 23LO connected to the upper left base pivot axis 19LA and to the upper left fork pivot axis 21LA.

The right actuator 17R is a right linear actuator connected at a first end to an upper right portion of the base beam 3 and connected at a second end to an upper end of the inner right arm 23RI extending above the lower right base pivot axis 19RB, and extension and retraction of the right linear actuator 17R moves the right fork pair 15R between the lowered right position R1 and the raised right position R2. Similarly the left actuator 17L is a left linear actuator connected at a first end to an upper left portion of the base beam 3 and connected at a second end to an upper end of the inner left arm 23LI extending above the lower left base pivot axis 19LB, and wherein extension and retraction of the left linear actuator 17L moves the left fork pair 15L between the lowered left position L1 and the raised left position 12.

In summary the right actuator 17R is connected at a first end to the base frame 3 and at a second end to the right parallel arm linkage 13R and is operative to move the right parallel arm linkage 13R from a raised position R2 extending outward from the base frame to the right of the path of the loader vehicle 5, to a lowered position R1 extending downward from the base frame 3, and the left actuator 17L is connected at a first end to the base frame 3 and at a second end to the left parallel arm linkage 13L and is operative to move the left parallel arm linkage 13L from a raised position L2 extending outward from the base frame 3 to the left of the path of the loader vehicle 5, to a lowered position R1 extending downward from the base frame 3.

Figure 4:
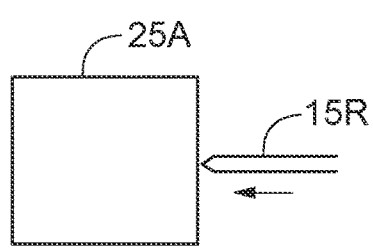
FIG. 4 is schematic side view of a fork pair being inserted into a large bale.
Figure 5:
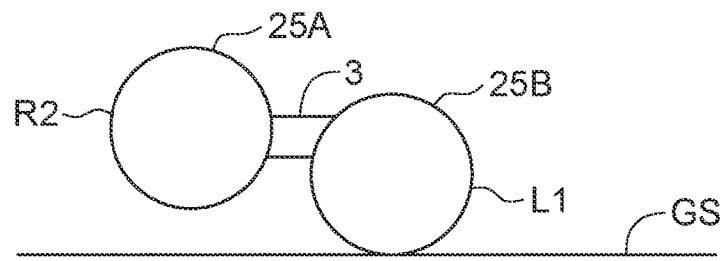
FIG. 5 is schematic front view of the embodiment of FIG. 1 with two bales inserted onto the forks, and with the right fork pair in the raised position and with the left fork pair in the lowered position.
Figure 6:
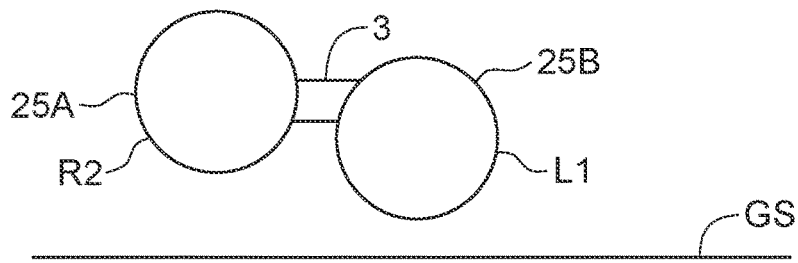
FIG. 6 is schematic front view of the embodiment of FIG. 1 with two bales inserted onto the forks, and with the right fork pair in the raised position and with the left fork pair also in the raised position.

The present disclosure also provides a method of picking large bales from the ground and transporting the large bales to a storage location. The method comprises mounting right and left fork pairs 15R, 15L to a base frame 5 mounted to a loader vehicle 5, the base frame 5 operative to move up and down with respect to the loader vehicle 5. It is immaterial whether the first bale is picked up by the right or left fork pair 15R, 15L, and for this example of the method the right fork pair 15R is used to pick up the first bale 25A by, with the right fork pair 15R in position R1, inserting the right fork pair 15R into the first bale 25A as seen in FIG. 4 and with the right actuator 17R moving the first fork pair 15R upward and outward with respect to the base frame above the ground and to a right side of a path of the loader vehicle at R2, and, with the left fork pair in position L1, inserting the left fork pair 15L into a second bale 25B as seen in FIG. 5 and then moving the base frame 3 upward above the ground surface as seen in FIG. 6.

Figure 7:
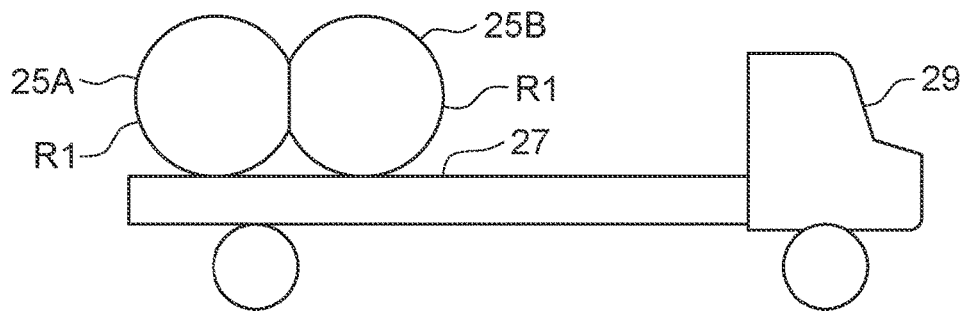
FIG. 7 is a schematic side view of a transport vehicle with two bales squeezed together to facilitate loading more bales on the bed of the transport vehicle.

The first and second bales 25A, 25B are placed on a bed 27 of a transport vehicle 29 by moving the base frame downward to rest the second bale 25B on the bed and moving the right fork pair 15R downward and inward to rest the first bale on the bed 27 squeezed against the second bale as seen in FIG. 7. The right and left fork pairs 15R, 15L are then withdrawn from the corresponding first and second bales 25A, 25B.

The method described above allows the two bales to be picked up without actuating the left actuator 17L, typically a hydraulic cylinder, which can facilitate connection and valving of the two actuators 17R, 17L.

Figure 8:
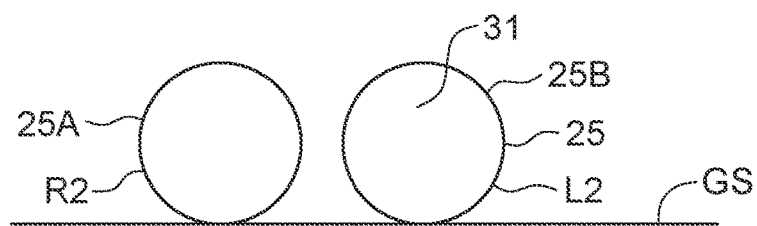
FIG. 8 is a schematic front view of two bales in rows stored on the ground and nt touching each other to thereby prevent spoilage.

The transport vehicle 29 is then moved to the storage location, and the right and left fork pairs 15R, 15L are inserted into the corresponding first and second bales 25A, 25B and the fork pairs are raising to raise the first and second bales which are then moved the storage location, typically a ground surface GS. The right and left fork pairs 15R, 15L are then moved outward and upward to position R2 and the base frame is moved downward rest the first and second bales 25A, 25B on the ground surface GS such that the first bale 25A is not in contact with the second bale 25B as seen in FIG. 8, and the right and left fork pairs are withdrawn from the corresponding first and second bales 25A, 25B.

The apparatus and method of the present disclosure prevents damage to twine or net wrap on the bales, reduces transport dimensions, and stores the bales on the ground so they are not touching each other to prevent spoilage.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A bale loader apparatus for loading and storing large bales, the apparatus comprising:
    a base frame adapted at a loader end for attachment to a loader vehicle operative to move the base frame up and down;
    right and left fork frames;
    a right fork pair configured to be inserted into a first large bale and attached to the right fork frame and extending away from the loader end of the base frame;
    a left fork pair configured to be inserted into a second large bale and attached to the left fork frame and extending away from the loader end of the base frame;
    a right actuator operative to pivot the right fork pair with respect to the base frame upward and outward to the right of a path of the loader vehicle from a lowered right position to a raised right position;
    a left actuator operative to pivot the left fork pair with respect to the base frame upward and outward to the left of the path of the loader vehicle from a lowered left position to a raised left position;
    a right parallel arm linkage pivotally connected at inner ends of the right parallel arm linkage to the base frame about upper and lower right base pivot axes located on a right inner line sloping upward and outward to the right with respect to the path of the loader vehicle, the right parallel arm linkage pivotally connected at outer ends of the right parallel arm linkage to the right fork frame about upper and lower right fork pivot axes located on a right outer line sloping upward and outward to the right with respect to the path of the loader vehicle, and wherein the right inner line and right outer line are substantially parallel; and
    a left parallel arm linkage pivotally connected at inner ends of the left parallel arm linkage to the base frame about upper and lower left base pivot axes located on a left inner line sloping upward and outward to the left with respect to the path of the loader vehicle, and the left parallel arm linkage pivotally connected at outer ends of the left parallel arm linkage to the left fork frame about upper and lower left fork pivot axes located on a left outer line sloping upward and outward to the left with respect to the path of the loader vehicle, and wherein the left inner line and left outer line are substantially parallel,
    wherein the right parallel arm linkage and left parallel arm linkage are configured to maintain the corresponding right and left fork pairs substantially parallel to a ground surface when in an operating position.

2. The apparatus of claim 1 wherein:
    the right parallel arm linkage comprises an inner right arm pivotally connected to the lower right base pivot axis and to the lower right fork pivot axis and an outer right arm pivotally connected to the upper right base pivot axis and to the upper right fork pivot axis; and
    the left parallel arm linkage comprises an inner left arm pivotally connected to the lower left base pivot axis and to the lower left fork pivot axis and an outer left arm pivotally connected to the upper left base pivot axis and to the upper left fork pivot axis.

3. The apparatus of claim 2 wherein:
    the right actuator is a right linear actuator connected at a first end to an upper right portion of the base frame and connected at a second end to an upper end of the inner right arm extending above the lower right base pivot axis, and wherein extension and retraction of the right linear actuator moves the right fork pair between the lowered right position and the raised right position; and
    the left actuator is a left linear actuator connected at a first end to an upper left portion of the base frame and connected at a second end to an upper end of the inner left arm extending above the lower left base pivot axis, and
    wherein extension and retraction of the left linear actuator moves the left fork pair between the lowered left position and the raised left position.

4. The apparatus of claim 1 wherein:
    the right actuator is connected at a first end to the base frame and at a second end to the right parallel arm linkage and is operative to move the right parallel arm linkage from the raised right position extending outward from the base frame to the right of the path of the loader vehicle, to the lowered right position extending downward from the base frame; and
    the left actuator is connected at a first end to the base frame and at a second end to the left parallel arm linkage and is operative to move the left parallel arm linkage from the raised left position extending outward from the base frame to the left of the path of the loader vehicle, to the lowered left position extending downward from the base frame.

5. The apparatus of claim 1 wherein the loader vehicle is further operative to tilt the base frame forward and rearward.

* * * * *